(12) United States Patent
Shimokura et al.

(10) Patent No.: US 10,742,871 B2
(45) Date of Patent: Aug. 11, 2020

(54) IMAGING PICKUP APPARATUS OF WHICH DISPLAY START TIMING AND DISPLAY QUALITY ARE SELECTABLE, METHOD OF CONTROLLING THE SAME

(71) Applicant: CANON KABUSHIKI KAISHA, Tokyo (JP)

(72) Inventors: Shintaro Shimokura, Tokyo (JP); Ayaka Kinoshita, Kawasaki (JP); Taro Matsuno, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/438,982

(22) Filed: Jun. 12, 2019

(65) Prior Publication Data

US 2019/0297250 A1    Sep. 26, 2019

Related U.S. Application Data (63) Continuation of application No. 15/633,049, filed on Jun. 26, 2017, now Pat. No. 10,362,216.

(30) Foreign Application Priority Data

Jun. 27, 2016   (JP) .................................. 2016-126564

(51) Int. Cl.
    *H04N 5/232*    (2006.01)
    *G03B 17/20*    (2006.01)
    *G03B 17/40*    (2006.01)

(52) U.S. Cl.
    CPC ......... *H04N 5/23216* (2013.01); *G03B 17/20* (2013.01); *H04N 5/23241* (2013.01); *H04N 5/23293* (2013.01); *G03B 17/40* (2013.01)

(58) Field of Classification Search
    CPC ........... H04N 5/23216; H04N 5/23293; G03B 17/20; G03B 17/40
    See application file for complete search history.

(56) References Cited

U.S. PATENT DOCUMENTS

| 4,691,253 | A | 9/1987 | Silver |
| 2002/0054229 | A1* | 5/2002 | Sasaki ............... H04N 5/23293 348/312 |

(Continued)

FOREIGN PATENT DOCUMENTS

| CN | 104038685 A | 10/2014 |
| EP | 0854642 A2 | 7/1998 |

(Continued)

OTHER PUBLICATIONS

The above patent U.S. Patent document #1, U.S. Patent Publication #1, and Foreign Patent Documents #1-3 were cited in a British Search Report dated Nov. 22, 2017, which is enclosed, that issued in the corresponding U.K. Patent Application No. 1710209.6.

The above foreign patent document was cited in a Nov. 25, 2019 Chinese Office Action, which is enclosed with an English Translation, that issued in Chinese Patent Application No. 201710500535.9.

(Continued)

*Primary Examiner* — Gevell V Selby
(74) *Attorney, Agent, or Firm* — Cowan, Liebowitz & Latman, P.C.

(57) ABSTRACT

An image pickup apparatus of which the display start timing and the display quality are selectable. The image pickup apparatus has a switch which selectively switches display data to be displayed on a display device between the first display data output by the first output circuit, and the second display data output by the second output circuit, and display the first display data or the second display data on the display device, wherein the first display data is generated by the image data output by the image pickup device developed, and the second display data is generated by the image data transferred by a transfer circuit developed.

10 Claims, 3 Drawing Sheets

(56) References Cited

U.S. PATENT DOCUMENTS

| | | |
|---|---|---|
| 2008/0043132 A1 | 2/2008 | Gunter |
| 2010/0194917 A1* | 8/2010 | Funamoto ............ H04N 5/2256 348/223.1 |
| 2011/0102445 A1* | 5/2011 | Harada ................. G06F 3/1423 345/536 |
| 2012/0327285 A1* | 12/2012 | Kuroiwa .............. H04N 1/2112 348/333.05 |
| 2014/0118596 A1 | 5/2014 | Nakazono et al. |
| 2014/0132805 A1* | 5/2014 | Inoue ................. H04N 5/23293 348/240.99 |
| 2015/0138328 A1 | 5/2015 | Yokohama |
| 2016/0132369 A1* | 5/2016 | Lee ....................... G06F 1/3296 713/2 |
| 2017/0055808 A1 | 3/2017 | Hamada et al. |

FOREIGN PATENT DOCUMENTS

| | | |
|---|---|---|
| EP | 2731325 A1 | 5/2014 |
| GB | 2496717 A | 5/2013 |
| JP | 2012023496 A | 2/2012 |
| JP | 2014096749 A | 5/2014 |
| JP | 2015-148676 A | 8/2015 |
| JP | 2016076771 A | 5/2016 |

OTHER PUBLICATIONS

The above foreign patent document was cited in the Mar. 17, 2020 Japanese Office Action, which is enclosed without an English Translation, that issued in Japanese Patent Application No. 2016126564.

* cited by examiner

IMAGING PICKUP APPARATUS OF WHICH DISPLAY START TIMING AND DISPLAY QUALITY ARE SELECTABLE, METHOD OF CONTROLLING THE SAME

CROSS-REFERENCE TO RELATED APPLICATIONS

This application is a continuation of application Ser. No. 15/633,049, filed Jun. 26, 2017 the entire disclosure of which is hereby incorporated by reference.

BACKGROUND OF THE INVENTION

Field of the Invention

The present invention relates to an image pickup apparatus of which the display start timing and the display quality are selectable.

Description of the Related Art

As an image sensor mounted on an image pickup apparatus such as a digital camera, stacked image sensors in which a semiconductor integrated circuit chip (an image pickup chip) having an image pickup unit is stacked on a semiconductor integrated circuit chip (a processing chip) for performing image processing on an image signal, have appeared in recent years. In an image pickup apparatus including such an image sensor, a light that entered an image pickup unit is converted into an electrical signal, and digital image data resulting from an AD conversion of the electrical signal is transferred to a main chip. Then, image processing, display processing, etc. on the image data, are performed on the main chip side. Furthermore, Japanese Laid-Open Patent Publication (kokai) No. 2015-148676 proposes a configuration in which auto-focusing is performed in two stages: on the side of a processing chip in a stacked image sensor and on the side of a main chip, thereby achieving higher precision than that of auto-focusing performed only on the main chip side.

However, recently, the resolution and possible frame rate of an image sensor tend to be increasing significantly, and the amount of data communicated between the image sensor and a main chip is increasing. In general, an image sensor transfers image data obtained by shooting an image to a main chip, and the main chip develops the transferred image data to generate displayable data that can be displayed. In a case where development processing for generating display data is performed on the main chip side in this way, due to the transfer of image data from the image sensor to the main chip and the main chip performing processing such as primary storage of the image data in a memory, it takes time to start the image display. Therefore, the larger the data amount of image data, the longer the delay time to start the image display when the image data is reproduced on a live view. Furthermore, if the communication band between the image sensor and the main chip is insufficient, the transfer takes time, which causes a further delay in the start of the image display. Moreover, the highest speed of development processing in the main chip depends on the data transfer rate; therefore, if the communication band is insufficient, images taken by shooting cannot be reproduced on the live view at the original speed, and end up being reproduced in slow motion.

SUMMARY OF THE INVENTION

An object of the present invention is to enable the selection of the display start timing and the display quality in an image pickup apparatus.

Accordingly, the present invention provides an image pickup apparatus comprising an image pickup device which converts a received light into an electrical signal to output image data, a first development circuit which develops the image data output by the image pickup device to generate first display data, a first output circuit which outputs the first display data generated by the first development circuit, a second development circuit which develops the image data transferred by a transfer circuit, to generate second display data, a second output circuit which outputs the second display data generated by the second development circuit through a different path from a path used for the output by the first output circuit, a display device, and a switch which selectively switches display data to be displayed on the display device between the first display data output by the first output circuit and the second display data output by the second output circuit, and display the first display data or the second display data on the display device.

According to the present invention, it enables the selection of the display start timing and the display quality in an image pickup apparatus.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof.

Figure 1:
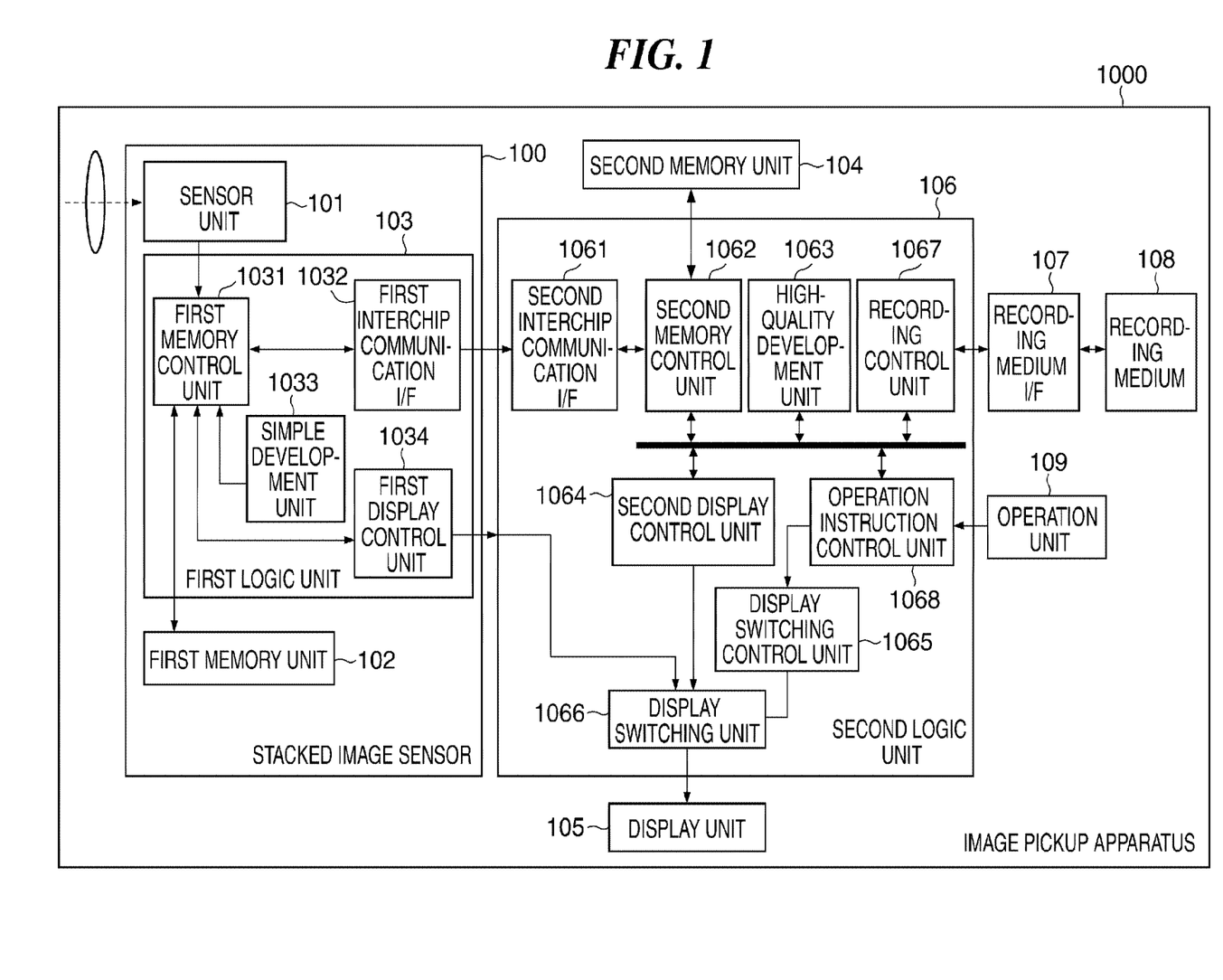
FIG. 1 is a block diagram of an image pickup apparatus.

FIG. 1 is a block diagram of an image pickup apparatus 1000 according to an embodiment of the present invention. The image pickup apparatus 1000 is configured, for example, as a digital camera with a stacked image sensor 100 mounted thereon. However, the present invention can be applied to any apparatus that comprises a stacked image sensor and has an image pickup function. For example, the present invention can be applied to digital video cameras, cell-phones, smartphones, tablets, and other electronic devices.

The image pickup apparatus 1000 comprises the stacked image sensor 100 (hereinafter, referred to as the "image sensor 100") and a second logic unit 106. The image sensor 100 is composed of a sensor unit 101 (an image pickup device), a first memory unit 102, and a first logic unit 103, which are arranged in a stack. The second logic unit 106 is included in a semiconductor chip which is separately provided from the image sensor 100. The second logic unit 106 is electrically connected to a second memory unit 104, a display unit 105, a recording medium I/F 107, and an operation unit 109. The second logic unit 106 is electrically connected to the first logic unit 103.

The sensor unit 101 is a so-called CMOS image sensor unit. The sensor unit 101 comprises an image pickup device and a drive unit, wherein the image pickup device is composed of a plurality of pixel units, and the drive unit drives the image pickup device. The sensor unit 101 transmits RAW data, which is digital image data obtained by converting a received light into an electrical signal and further performing analog-digital conversion on the electrical signal, to the first logic unit 103. The first logic unit 103 comprises a first memory control unit 1031, a first interchip communication I/F 1032 (a transfer circuit), a simple development unit 1033 (a first development circuit), and a first display control unit 1034 (a first output circuit). The first memory unit 102 is a random-accessible memory, and is subjected to read/write control by the first memory control unit 1031.

The first memory control unit 1031 is a so-called memory controller, and is connected to the sensor unit 101, each block in the first logic unit 103, and the first memory unit 102. In response to receipt of a request from each block in the first logic unit 103, the first memory control unit 1031 mediates so that the each block can properly access the first memory unit 102. The first memory control unit 1031 writes RAW data output from the sensor unit 101 into the first memory unit 102.

The first interchip communication I/F 1032 is an interface for transmitting a digital signal, and connects the image sensor 100 and the second logic unit 106 so that they can communicate with each other. Standards to be adopted as the first interchip communication I/F 1032 include, for example, LVDS (Low Voltage Differential Signaling), SATA (Serial ATA), PCIe (PCI Express), and so on. However, the standard to be adopted is not limited to these standards.

The first interchip communication I/F 1032 accesses the first memory unit 102 via the first memory control unit 1031 to read RAW data from the first memory unit 102, and transfers the read RAW data to the second logic unit 106. Here, the RAW data corresponds to data before being subjected to development processing; defect correction, predetermined offset processing, etc. can be performed on the RAW data by an image processing unit (not shown) included in the first logic unit 103.

The simple development unit 1033 accesses the first memory unit 102 via the first memory control unit 1031 to read RAW data from the first memory unit 102, and performs development processing on the read RAW data. The simple development unit 1033 performs development processing on the RAW data to generate first display data that is image data displayable on the display unit 105. The simple development unit 1033 writes back the generated first display data into the first memory unit 102 via the first memory control unit 1031. This development processing will be described later.

The first display control unit 1034 accesses the first memory unit 102 via the first memory control unit 1031, and while repeatedly reading first display data stored in the first memory unit 102 at predetermined intervals, outputs the read first display data onto the display unit 105 via a display switching unit 1066 of the second logic unit 106. As a path from the first display control unit 1034 to the display unit 105 through the display switching unit 1066 of the second logic unit 106, a transmission path which is separately provided from a transmission path between the first interchip communication I/F 1032 and a second interchip communication I/F 1061 is used. Therefore, respective communication bands do not affect each other.

The second logic unit 106 comprises the second interchip communication I/F 1061, a second memory control unit 1062, a high-quality development unit 1063 (a second development circuit), and a second display control unit 1064 (a second output circuit). The second logic unit 106 further comprises a display switching control unit 1065, the display switching unit 1066, a recording control unit 1067, and an operation instruction control unit 1068. The second memory unit 104 is a random-accessible memory, and is subjected to read/write control by the second memory control unit 1062. The display unit 105 is, for example, a liquid crystal panel, and displays thereon display data generated by development processing in the first logic unit 103 or the second logic unit 106.

The second interchip communication I/F 1061 of the second logic unit 106 is a transmission interface based on the same standard as the first interchip communication I/F 1032 of the first logic unit 103. In response to receipt of RAW data transferred from the first interchip communication I/F 1032, the second interchip communication I/F 1061 writes the RAW data into the second memory unit 104 via the second memory control unit 1062. The second memory control unit 1062 is a so-called memory controller, and is connected to a plurality of blocks in the second logic unit 106 and the second memory unit 104. In response to receipt of a request from each block connected in the second logic unit 106, the second memory control unit 1062 mediates so that the each block can properly access the second memory unit 104.

The high-quality development unit 1063 accesses the second memory unit 104 via the second memory control unit 1062 to read RAW data from the second memory unit 104, and performs development processing on the read RAW data. The high-quality development unit 1063 performs development processing on the RAW data to generate second display data that is image data displayable on the display unit 105, and also generate recording image data to be recorded on a recording medium 108. The high-quality development unit 1063 writes back the generated second display data and the generated recording image data into the second memory unit 104 via the second memory control unit 1062. This development processing will be described later.

The second display control unit 1064 accesses the second memory unit 104 via the second memory control unit 1062 to repeatedly read second display data stored in the second memory unit 104 at predetermined intervals, and outputs the read second display data on the display unit 105 via the display switching unit 1066 at the same time. The operation unit 109 is switches, a touch panel, etc., through which a user operates the image pickup apparatus 1000, and the operation unit 109 performs an AD conversion on an operation input by the user to generate an operation signal, and transmits the generated operation signal to the second logic unit 106.

In response to receipt of an operation signal transmitted from the operation unit 109, the operation instruction control unit 1068 transmits a control signal to the each block in the second logic unit 106. The display switching control unit 1065 transmits a control signal for switching the display to the display switching unit 1066 based on the control signal indicating the operation instruction from the user that is transmitted from the operation instruction control unit 1068.

The display switching unit 1066 is a switch for selecting one to be displayed on the display unit 105 from among first display data output from the first display control unit 1034 and second display data output from the second display control unit 1064. The display switching unit 1066 switches the switch based on a control signal received from the display switching control unit 1065, thereby serving as a switching unit that selectively switches between the first display data and the second display data and displays the first or second display data on the display unit 105.

The recording control unit 1067 reads recording image data stored in the second memory unit 104 via the second memory control unit 1062, and records the read recording image data onto the recording medium 108 via the recording medium I/F 107. Furthermore, the recording control unit 1067 can also read recording image data from the recording medium 108 via the recording medium I/F 107, and write the read recording image data into the second memory unit 104. The recording medium 108 is a recording medium like a memory card such as a so-called SD Card™. The recording medium I/F 107 is a device like a card slot to which the recording medium 108 can be removably attached. The above is a configuration of the image pickup apparatus 1000.

Subsequently, the operations of the simple development unit 1033 and the high-quality development unit 1063 when images are taken, are described in detail. The simple development unit 1033 performs development processing in a simpler way (hereinafter, also referred to as "simple development processing") than that performed by the high-quality development unit 1063, by processing the smaller amount of data than the amount of data processed when the high-quality development unit 1063 develops RAW data. For example, with respect to RAW data stored in first memory unit 102, the simple development unit 1033 decimates the number of pixels or the number of frames, or reduces the number of reference pixels in interpolation or image creation, thereby performing development processing with the data processing amount reduced.

For example, when the transfer rate of RAW data from the sensor unit 101 to the first memory unit 102 is 120 fps, the simple development unit 1033 performs development processing on only one-quarter of the RAW data. That is, the simple development unit 1033 performs simple development processing, which corresponds to development processing performed on data with a transfer rate of 30 fps, on the RAW data, thereby generating first display data. Furthermore, for example, in a case where the number of pixels of RAW data to be transferred from the sensor unit 101 to the first memory unit 102 is 4K size, the simple development unit 1033 performs development processing by decimating it to, for example, VGA size. That is, the simple development unit 1033 performs simple development processing, which corresponds to development processing performed on VGA-size data, on the RAW data, thereby generating first display data. The 4K size is 4096×2160 pixels, and the VGA size is 640×480 pixels.

It should be noted that the simple development processing by the simple development unit 1033 is not limited to these examples. The simple development processing should be development processing for generating display data of which the image quality is limited, thereby making the circuit size or power consumption smaller than that of the high-quality development unit 1063.

On the other hand, with respect to RAW data written in the second memory unit 104, the high-quality development unit 1063 performs high-quality development processing, during which the number of pixels or the number of frames is not decimated and the number of reference pixels in interpolation or image creation is increased as many as possible.

For example, when the transfer rate of RAW data to the second memory unit 104 is 120 fps, the high-quality development unit 1063 performs development processing on all of the RAW data. That is, the high-quality development unit 1063 performs development processing to be performed on data with a transfer rate of 120 fps, on the RAW data, thereby generating second display data and recording image data. Alternatively, for example, when the number of pixels of RAW data to be transferred to the second memory unit 104 is 4K size, the high-quality development unit 1063 performs development processing on all pixels of the RAW data. That is, the high-quality development unit 1063 performs development processing to be performed on 4K-size data on the RAW data, thereby generating second display data and recording image data.

It should be noted that also in the development processing preformed by the high-quality development unit 1063, the decimation of the number of pixels or the number of frames can be performed on RAW data. However, also in this case, the simple development unit 1033 is configured to set, as a target for development processing, the same or smaller number of frames or pixels as the number of frames or pixels targeted in development processing preformed by the high-quality development unit 1063, thereby performing development processing equivalent to or simpler than development processing preformed by the high-quality development unit 1063.

It should be noted that the high-quality development unit 1063 can be configured to perform image processing for generating recording image data, and then reduce the recording image data according to the resolution of the display unit 105 to generate second display data. When images are taken, RAW data is transferred in real time to the second memory unit 104 via the second interchip communication I/F 1061. On the other hand, when images are reproduced, RAW data is transferred to the second memory unit 104 via the recording control unit 1067.

Figure 2:
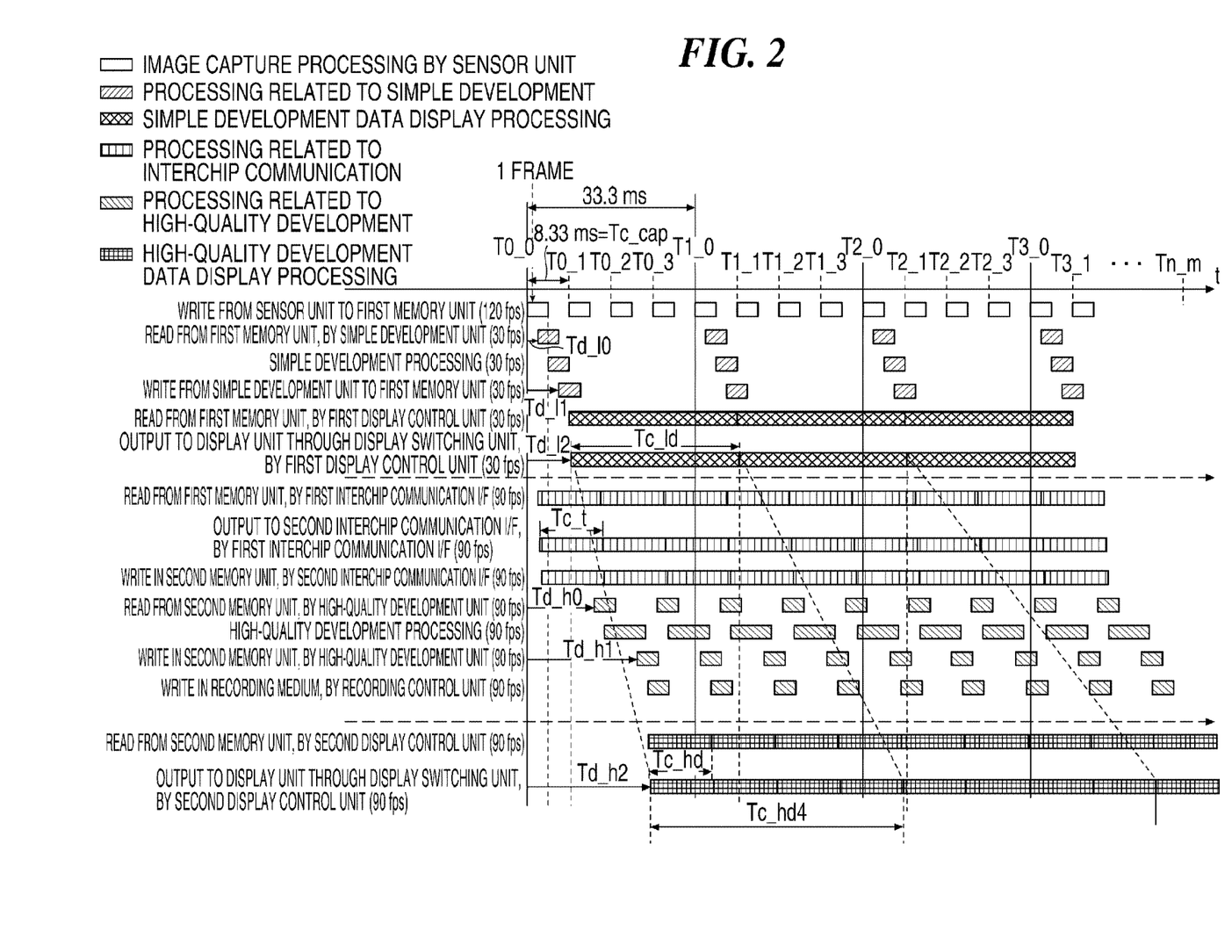
FIG. 2 is a timing chart in a case where the interchip communication band is insufficient.
Figure 3:
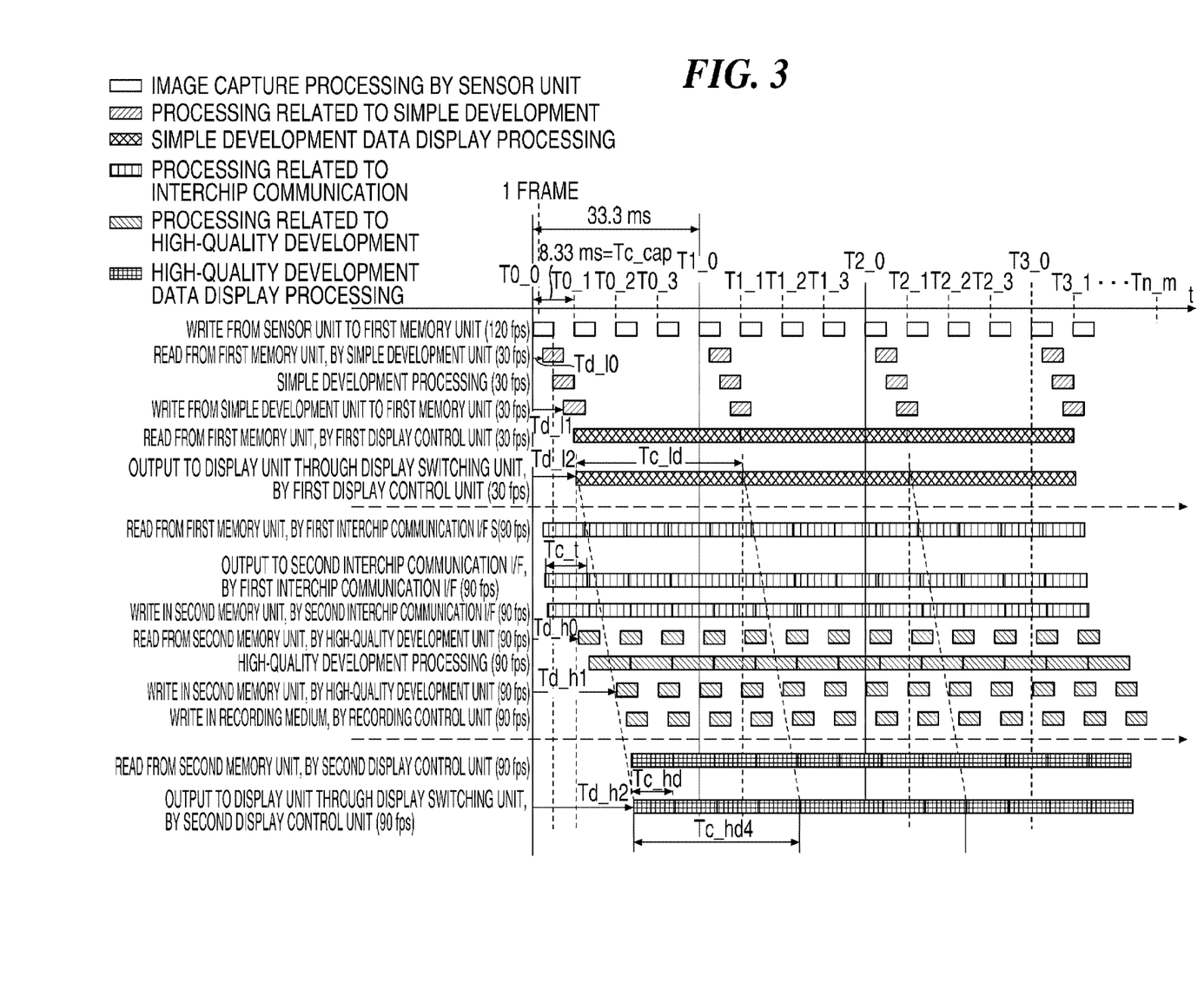
FIG. 3 is a timing chart in a case where the interchip communication band is sufficient.

Subsequently, the flow of a process of taking images while displaying live-view images on the display unit 105 is explained with timing charts shown in FIGS. 2 and 3. FIGS. 2 and 3 are timing charts when the interchip communication band between the first interchip communication I/F 1032 and the second interchip communication I/F 1061 is insufficient and when it is sufficient, respectively.

First, an example shown in FIG. 2 is explained. In the example shown in FIG. 2, an interval Tc_t of data transfer between the first interchip communication I/F 1032 and the second interchip communication I/F 1061 (between chips) is described to be Tc_t=11.1 msec, i.e., equivalent to 90 fps. A transfer interval Tc_cap of RAW data from the sensor unit 101 to the first memory unit 102 is described as Tc_cap=8.33 msec, i.e., equivalent to 120 fps. A data transfer interval Tc_t shall be limited by the transfer band (the communication band) between the first interchip communication I/F 1032 and the second interchip communication I/F 1061, and, in the example shown in FIG. 2, Tc_t>Tc_cap holds true. While the output rate of RAW data from the sensor unit 101 to the first memory unit 102 is equivalent to 120 fps, the interchip transfer rate is equivalent to 90 fps which is slower than 120 fps, and therefore, the interchip communication band is insufficient.

First, the simple development processing and display operation of the first logic unit 103 are explained. At time T0_0, the transfer of RAW data from the sensor unit 101 to the first memory unit 102 is started. After that, after a lapse of time Td_10 from time T0_0, when the transfer of as many pixels as required to start the development processing has been completed, the simple development unit 1033 starts reading out RAW data from the first memory unit 102, and starts the simple development processing. The simple development processing generates first display data.

The simple development unit 1033 starts the transfer of the first display data to the first memory unit 102, sequentially from a pixel area that has been subjected to the simple development processing. An elapsed time from the start of the transfer of the RAW data from the sensor unit 101 to the start of the transfer of the first display data to the first memory unit 102 is referred to as delay time Td_11.

After that, the first display control unit 1034 reads out the first display data from the first memory unit 102, and outputs the read first display data to the display switching unit 1066. At this time, in a case where the output from the first display control unit 1034 is selected by the display switching unit 1066, the first display data is displayed on the display unit 105. An elapsed time from the start of the transfer of the RAW data from the sensor unit 101 to the start of the display of the first display data on the display unit 105 is referred to as delay time Td_12.

Next, the high-quality development processing and display operation of the second logic unit 106 are explained. At time T0_0, after the transfer of RAW data from the sensor unit 101 to the first memory unit 102 is started, the first interchip communication I/F 1032 starts reading out the RAW data from the first memory unit 102. After that, the first interchip communication I/F 1032 starts transferring the RAW data to the second memory unit 104 via the second interchip communication I/F 1061. Here, the transfer of the RAW data to the second interchip communication I/F 1061 performed by the first interchip communication I/F 1032 temporally overlaps with the simple development processing performed by the simple development unit 1033, i.e., is performed in parallel with the simple development processing. That is, the transfer of the RAW data is performed in the background of the generation of the first display data. By performing the processings in parallel in this way, the start of development processing in the second logic unit 106 is brought forward.

After a lapse of time Td_h0 from time T0_0, when the transfer of as many pixels as required to start the development processing has been completed, the high-quality development unit 1063 starts reading out RAW data from the second memory unit 104, and starts the high-quality development processing. The high-quality development processing generates second display data and recording image data. The high-quality development unit 1063 starts the transfer of the second display data to the second memory unit 104, sequentially from a pixel area that has been subjected to the high-quality development processing. An elapsed time from the start of the transfer of the RAW data from the sensor unit 101 to the start of the transfer of the second display data to the second memory unit 104 is referred to as delay time Td_h1.

Furthermore, the recording control unit 1067 transfers the recording image data to the recording medium 108, sequentially from a pixel area that has been subjected to the high-quality development processing. After that, the second display control unit 1064 reads out the second display data from the second memory unit 104, and outputs the second display data to the display unit 105 via the display switching unit 1066. At this time, in a case where the output from the second display control unit 1064 is selected by the display switching unit 1066, the second display data is displayed on the display unit 105. An elapsed time from the start of the transfer of the RAW data from the sensor unit 101 to the start of the display of the second display data on the display unit 105 is referred to as delay time Td_h2.

Here, the display start timing in a case where the first display data is to be displayed on the display unit 105 is earlier than the display start timing in a case where the second display data is to be displayed on the display unit 105. That is, it is possible to display the first display data on the display unit 105 earlier by a difference between Td_h2 and Td_12 (Td_h2−Td_12) than the second display data.

Incidentally, the simple development unit 1033 decimates the number of frames or pixels to perform the development processing; therefore, the image quality of first display data is lower than second display data that can be displayed with the original image quality. On the other hand, a per-screen reading interval in a case where first display data is displayed is Tc_1d (33.3 ms), and this is the same as a time interval from time T0_0 to time T1_0. However, because of Tc_t>Tc_cap, a reading interval Tc_hd, which is the display rate, of the second display control unit 1064 is longer than the transfer interval Tc_cap (8.33 ms). Thus, a per-screen reading interval Tc_hd4 in a case where second display data is displayed is longer than Tc_1d. That is, in a case where second display data is displayed, the reproduction speed is slower than that in a case where first display data is displayed (equivalent to 120 fps), and the second display data is reproduced in slow motion (equivalent to 90 fps).

Therefore, in a case of Tc_t>Tc_cap like the example shown in FIG. 2, in a case of desiring to prioritize the suppression of display delay over the image quality, the display switching unit 1066 should select the display of first display data. On the other hand, in a case of desiring to prioritize the display quality, though the start of the display is delayed and the reproduction speed becomes slower, the display switching unit 1066 should select the display of second display data. A user can arbitrarily select the display of display data through the operation unit 109.

Subsequently, an example shown in FIG. 3 is explained. In the example shown in FIG. 3, the interval Tc_t of data transfer between the first interchip communication I/F 1032 and the second interchip communication I/F 1061 is described to be Tc_t=8.33 msec, i.e., equivalent to 120 fps. The transfer interval Tc_cap of RAW data from the sensor unit 101 to the first memory unit 102 is Tc_cap=8.33 msec, i.e., equivalent to 120 fps as is same with the example shown in FIG. 2. In the example shown in FIG. 3, Tc_t=Tc_cap holds true. While the output rate of RAW data from the sensor unit 101 to the first memory unit 102 is equivalent to 120 fps, the interchip transfer rate is also equivalent to 120 fps, which meets Tc_t≤Tc_cap, and therefore, the interchip communication band is sufficient.

In the example shown in FIG. 3, the simple development processing and display operation of the first logic unit 103, and the high-quality development processing and display operation of the second logic unit 106 are basically the same as the example shown in FIG. 2. The operation of the first logic unit 103 in the example shown in FIG. 3 is the same as that in the example shown in FIG. 2; therefore, lengths of time Td_10, delay time Td_11, and delay time Td_12 in the example of FIG. 3 are the same as those in the example shown in FIG. 2. On the other hand, the data transfer interval Tc_t is shorter than that in the example shown in FIG. 2, which makes time Td_h0, delay time Td_h1, delay time Td_h2, reading interval Tc_hd, and per-screen reading interval Tc_hd4 are shorter in time length than those in the example shown in FIG. 2. It should be noted that the per-screen reading interval Tc_hd4 is the same in length of time as Tc_1d.

The timing to start the image display is the same as the example shown in FIG. 2. That is, the display start timing in a case where first display data is displayed on the display unit 105 is earlier by a difference between Td_h2 and Td_12

(Td_h2−Td_12) than the display start timing in a case where second display data is displayed on the display unit 105. In the example shown in FIG. 3, the difference between Td_h2 and Td_12 is smaller than that in the example shown in FIG. 2. As for the image display quality in the example shown in FIG. 3, the simple development processing by the simple development unit 1033 is the same as that in the example shown in FIG. 2; therefore, the image quality of first display data is same as that in the example shown in FIG. 2. The image quality of second display data in the example shown in FIG. 3 is also same as that in the example shown in FIG. 2.

In the example shown in FIG. 3, the reading interval Tc_hd never falls below the transfer interval Tc_cap. That is, as for the reproduction speed, the per-screen reading interval Tc_hd4 is the same in length of time as Tc_1d. Here, the highest speed of the development processing performed by the high-quality development unit 1063 depends on the data transfer interval Tc_t. By performing the development processing by the high-quality development unit 1063 at the processing speed according to the data transfer interval Tc_t (in the example shown in FIG. 3, the same speed), second display data can be displayed at the reproduction speed according to the transfer rate. Therefore, even when second display data is displayed, the second display data can be reproduced at the original speed (can be displayed in real time).

Therefore, in a case of Tc_t≤Tc_cap like the example shown in FIG. 3, in a case of desiring to prioritize the suppression of display delay over the image quality, the display switching unit 1066 should select the display of first display data. On the other hand, in a case of desiring to prioritize the display quality, though the start of the display is delayed, the display switching unit 1066 should select the display of second display data.

According to the present embodiment, the simple development unit 1033 mounted on the stacked image sensor 100 performs development processing simpler than that performed by the high-quality development unit 1063 mounted on the second logic unit 106. Furthermore, the output start timing of first display data is earlier than the output start timing of second display data. Then, the display switching unit 1066 selectively switches between first display data generated by the simple development unit 1033 and second display data generated by the high-quality development unit 1063, and displays the first or second display data on the display unit 105. Accordingly, two kinds of display data generated through two types of development processing can be selectively switched to be displayed, which makes it possible to select the display start timing and the display quality.

The earliest display start timing in a case where first display data is displayed is irrelevant to the interchip communication band; however, as for the earliest display start timing in a case where second display data is displayed, the more insufficient the interchip communication band is, the further the display start timing is delayed. Thus, especially when the interchip communication band is insufficient, by selecting first display data as data to be displayed, the suppressing effect of display delay is enhanced. Incidentally, the simpler the simple development processing performed by the simple development unit 1033 is, the further the output start timing of first display data is brought forward. Therefore, the amount of data processed during the simple development processing should be set according to the required degree of the suppressing effect of display delay.

It should be noted that power-saving mode in which the development processing performed by the high-quality development unit 1063 is suspended while first display data is displayed on the display unit 105 can be adopted. For example, while first display data is displayed, the power supply to the high-quality development unit 1063 is shut off. It should be noted that at this time, when operations of components related to the generation and display of second display data are deactivated, power conservation can be enhanced. Therefore, the power supply to the second display control unit 1064 and the display switching control unit 1065 can be also shut off. It should be noted that during the period of the power-saving mode, data to be recorded on the recording medium 108 via the recording control unit 1067 can be RAW data before being subjected to development processing.

It should be noted that the display switching unit 1066 switches display data to be displayed on the display unit 105 based on a user's instruction received through the operation unit 109. However, the display switching unit 1066 can perform the switching according to the state of display instructed through the operation unit 109. For example, when an instruction to enlarge an image has been received through the operation unit 109, second display data developed by the high-quality development unit 1063 can be selected to suppress the degradation of the image quality when the enlarged image is displayed.

It should be noted that in a case where the generation of second display data is completed in the middle of displaying first display data on the display unit 105, it can be configured to automatically switch the display data to be displayed from the first display data to the second display data. For example, at the point when the development by the high-quality development unit 1063 is completed during the display of first display data and the display of second display data becomes possible, the high-quality development unit 1063 outputs a predetermined signal to the operation instruction control unit 1068. In response to receipt of the predetermined signal, the operation instruction control unit 1068 sends a control signal to the display switching unit 1066, thereby the second display data is selected to be displayed instead of the first display data.

It should be noted that, regarding the interchip data transfer interval Tc_t, there are described the example of Tc_t is equivalent to 90 fps (FIG. 2) and the example of Tc_t is equivalent to 120 fps (FIG. 3); however, the interchip data transfer interval Tc_t is not limited to these examples. It should be noted that the display switching unit 1066 is disposed in the second logic unit 106 in these examples; however, the display switching unit 1066 can be disposed outside the second logic unit 106.

As above, the present invention is described in detail on the basis of the preferred embodiment; however, the invention is not limited to this particular embodiment, and includes various forms without departing from the scope of the invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-126564, filed Jun. 27, 2016 which is hereby incorporated by reference wherein in its entirety.

What is claimed is:

1. An image pickup apparatus comprising:
an image pickup device which converts a received light into an electrical signal to output image data;
a first memory which stores the output image data;
a first development circuit which develops the output image data to generate first display data;
a second development circuit which develops the output image data to generate second display data which has larger amount of data than that of the first display data;
a second memory which stores the output image data or the second display data developed by the second development circuit;
a first transfer circuit which transfers the image data stored in the first memory to the second memory;
a second transfer circuit which transfers the first display data to a display device; and
a third transfer circuit which transfers the second display data stored in the second memory to the display device,
wherein the second development circuit and the third transfer circuit are in a power-saving mode while the first display data is displayed on the display device.

2. The image pickup apparatus according to claim 1, wherein timing for starting output of the first display data to the display device is earlier than timing for starting output of the second display data to the display device.

3. The image pickup apparatus according to claim 1, wherein the first development circuit performs a simple development processing, which is simpler than development processing performed by the second development circuit, by decimating frames or decimating the number of pixels when developing the image data.

4. The image pickup apparatus according to claim 1, wherein
the first development circuit performs a simple development processing, which is simpler than development processing performed by the second development circuit, and
the first development circuit performs the simple development processing by setting, as a target for development processing, the same or smaller number of frames or pixels as the number of frames or pixels targeted in the development processing performed by the second development circuit.

5. The image pickup apparatus according to claim 1, wherein the second development circuit generates the second display data at a processing speed according to a transfer rate of the transfer circuit.

6. The image pickup apparatus according to claim 1, wherein the first transfer circuit transfers the image data in background of the generation of the first display data performed by the first development circuit.

7. The image pickup apparatus according to claim 1, wherein power supply to the second development circuit and the third transfer circuit is shut off while the first display data is displayed on the display device.

8. The image pickup apparatus according to claim 1, further comprising a switch which selectively switches display data to be supplied to the display device and to be displayed on the display device, between the first display data and the second display data, wherein the switch switches display data to be displayed on the display device based on an instruction from a user.

9. The image pickup apparatus according to claim 1, wherein the image data is RAW data.

10. A method of controlling an image pickup apparatus comprising:
converting a received light into an electrical signal to output image data;
storing, in a first memory, the output image data;
developing, via a first development circuit, the output image data to generate first display data;
developing, by a second development circuit, the output image data to generate second display data which has a larger amount of data than that of the first display data;
storing, in a second memory, the output image data or the second display data developed by the second development circuit;
wherein the image data stored in the first memory is transferred to the second memory via a first transfer circuit,
wherein the first display data is transferred to a display device via a second transfer circuit;
wherein the second display data stored in the second memory is transferred, via a third transfer circuit, to the display device; and
wherein the second development circuit and the third transfer circuit are in a power-saving mode while the first display data is displayed on the display device.

* * * * *